United States Patent
Rosetto

(10) Patent No.: US 6,834,567 B2
(45) Date of Patent: Dec. 28, 2004

(54) MULTIPLE TORQUE ADJUSTABLE SPINDLES WITH A SINGLE DRIVE MOTOR

(75) Inventor: Steven Rosetto, Ft. Wayne, IN (US)

(73) Assignee: General Motors Corporation, Detroit, MI (US)

( * ) Notice: Subject to any disclaimer, the term of this patent is extended or adjusted under 35 U.S.C. 154(b) by 206 days.

(21) Appl. No.: 10/167,772

(22) Filed: Jun. 11, 2002

(65) Prior Publication Data

US 2003/0226427 A1 Dec. 11, 2003

(51) Int. Cl.[7] .......................... B25B 23/00; B25B 23/14
(52) U.S. Cl. ...................... 81/57.22; 81/57.14; 81/57.3; 81/57.36; 81/467
(58) Field of Search ................... 81/57, 57.11, 57.14, 81/57.22, 57.3, 57.32, 57.36, 467, 473–477, 480

(56) References Cited

U.S. PATENT DOCUMENTS

| 2,777,346 | A | * | 1/1957 | Brame .................... 81/476 |
| 2,964,152 | A | * | 12/1960 | Arthur ................... 81/57.22 |
| 5,572,905 | A | * | 11/1996 | Cook, Jr. ............... 81/57.22 |
| 6,253,644 | B1 | * | 7/2001 | Duquette .............. 81/57.22 |
| 6,358,152 | B2 | * | 3/2002 | Casutt ................... 464/32 |

* cited by examiner

Primary Examiner—Debra S. Meislin
(74) Attorney, Agent, or Firm—Laura C. Hargitt

(57) ABSTRACT

A multiple spindle tool has a single input drive motor and a plurality of output spindles. A gear arrangement including a central gear and three planet gears and three slip clutches are positioned between the drive motor and the output spindles. Each of the slip clutches drives a respective output spindle until a predetermined torque, set at respective clutches, is reached. Each of the slip clutches receives input rotation and torque from respective ones of the planet gears.

2 Claims, 1 Drawing Sheet

US 6,834,567 B2

MULTIPLE TORQUE ADJUSTABLE SPINDLES WITH A SINGLE DRIVE MOTOR

TECHNICAL FIELD

This invention relates to machine tools and more particularly to machine tools having multiple spindles.

BACKGROUND OF THE INVENTION

Machine tools with multiple spindles are used in assembly processes to tighten many fasteners at one time. When the torque requirement is low, i.e. less than 12 Nm, the tools are quite often ineffective. Under these conditions the tool will often under-tighten one or more of the fasteners. This leads to the inspector or the operator to use a separate tool to tighten the incorrect fasteners. In many instances, the manufacturer has resorted to using a single spindle nut runner in place of a multiple spindle tool. This solution results in a more time consuming operation.

SUMMARY OF THE INVENTION

It is an object of the present invention to provide an improved multiple spindle tool.

In one aspect of the present invention, a single motor is employed to drive a plurality of spindles. In another aspect of the present invention, a gear arrangement is placed between the motor and the spindles. In yet another aspect of the present invention, the gear arrangement is comprised of a central gear (sun gear) and three planet gears. In still another aspect of the present invention, the planet gears are fixed in a common carrier.

In yet still another aspect of the present invention, each of the spindles has an input shaft and an output shaft. In a further aspect of the present invention, an adjustable slip clutch is positioned between the input shaft and output shaft for each of the spindles. In a yet further aspect of the present invention, the gearing arrangement, input and output shafts, and the slip clutches are enclosed in a housing. In a still further aspect of the present invention, the output shaft of each spindle is supported in a bearing positioned in a lower cover of the housing.

DESCRIPTION OF AN EXEMPLARY EMBODIMENT

Figures 1, 2:
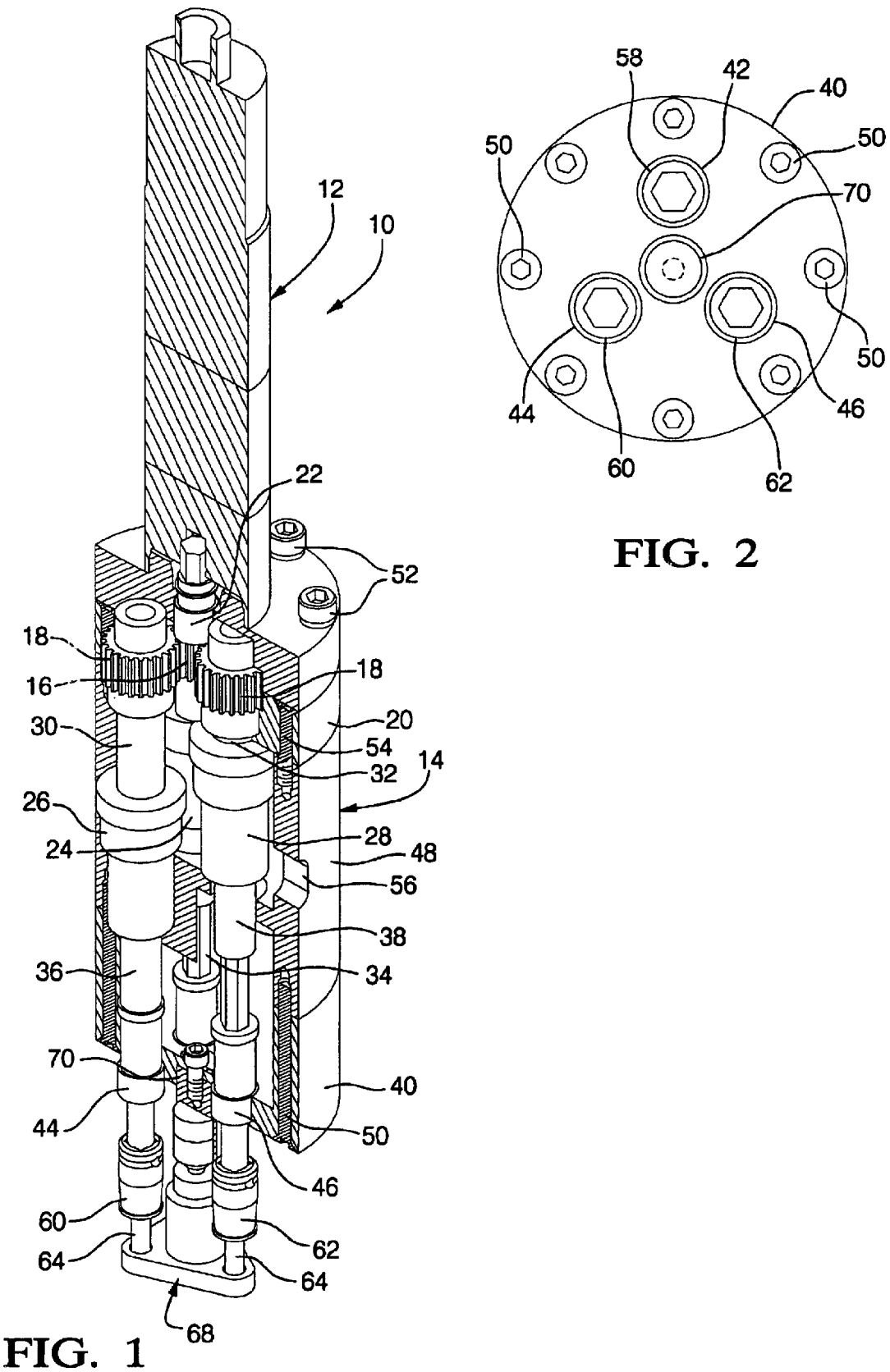
FIG. 1 is an isometric view, partly in section, of a tool incorporating the present invention.
FIG. 2 is a bottom view of the tool shown in FIG. 1.

Referring to the drawings, wherein like characters represent the same or corresponding parts, there is seen in FIG. 1 a machine tool 10. The machine tool 10 has an air motor 12 mounted on a housing 14. A central or sun gear 16 and three planet gears 18 are mounted in an upper housing portion 20. The planet gears 18 each mesh with the central gear 16. Only two of the planet gears 18 are shown in FIG. 1. The central gear 16 is drivingly connected with the motor 12 through a drive shaft 22.

The tool 10 has three conventional adjustable slip clutches 24, 26, 28 that are continuously drivingly connected to respective ones of the planet gears 18 through input shafts 30, 32 (the third input shaft is not shown). The design and construction of conventional slip clutches is well-known in the art. Each of the slip clutches 24, 26, 28 has a respective output shaft 34, 36, 38. The output shafts 34, 36, 38 are supported in a lower housing cover 40 by respective bearings 42, 44, 46, as seen in FIGS. 1 and 2.

The upper housing portion 20 and the lower housing cover 40 are joined by a central housing 48. The lower housing cover 40 is secured to the central housing 48 by a plurality of threaded fasteners 50. The motor 12 is secured to the upper housing portion 20 by a plurality of fasteners 52 and the upper housing portion 20 is secured to the central housing portion 48 by a plurality of threaded fasteners 54.

The slip clutches 24, 26, 28 are all positioned in the central housing portion 48. A plurality of openings 56 are formed in the central housing portion 48. The openings 56 permit the operator to adjust each of the slip clutches to the desired tightening torque.

Each of the output shafts 34, 36, 38 has a respective socket driver 58, 60, 62 mounted thereon. Each driver 58, 60, 62 has a hex opening adapted to engage a threaded fastener such as fasteners 64 shown in FIG. 1. The fasteners 64 are components of an assembly 68 that is to be mounted to a base, not shown. For example the assembly can be an antenna for an automobile that is to be mounted to a frame member. To properly locate the tool 10 on the assembly 68, a conventional locating member 70 is formed on or otherwise secured to the lower cover 40 to ensure that the socket drivers 58, 60, 62 locate properly on the fasteners 64.

Each of the fasteners 64 are tightened to a specific torque and in many instances this torque is equal to or less than 12 Nm. This is a low torque requirement for a nut-runner application that is not easily accomplished by conventional multiple spindle drivers. If each of the fasteners 64 has a distinct torque requirement, it is virtually impossible to perform this operation with a conventional multiple spindle tool. Thus it is currently the practice to employ a single nut-runner driver which requires the assembler to engage each of the fasteners 64 separately.

Obviously many modifications and variations are possible in light of the above teaching, therefore it is to be understood that the scope of the present invention is only limited by the appended claims.

What is claimed is:

1. A multiple spindle tool comprising:

a single motor having a drive shaft;

a gear arrangement including a central gear, rotatable with said drive shaft, and three planet gears meshing with said central gear for conjoint rotation therewith;

three slip clutches, each adjustable to an operating torque within a predetermined range of torque transmission, each slip clutch having an input shaft continuously rotatable with respective ones of said planet gears, and each slip clutch having an output shaft;

a housing including an upper housing portion, a central housing portions and a lower end cover, said motor being secured with said upper housing portion, said gear arrangement being rotatably mourned in said upper housing portion, said slip clutches being housed in said central housing portion, and said output shafts being rotatably supported in said lower end cover; and respective fastener driver means connected for rotation with each of said output shafts, said slip clutches transmitting rotation and torque to respective ones said output shafts at a torque value within said predetermined range and permitting relative rotation between respective ones of said input shafts and said output shafts when the torque value exceeds the predetermined range set at each of said three slip clutches.

2. The multiple spindle tool defined in claim 1 further comprising: said central housing portion having an access opening for each of said slip clutches to permit adjustment of said operating torque at each of said slip clutches.

* * * * *